United States Patent [19]

Held et al.

[11] Patent Number: 5,429,860
[45] Date of Patent: Jul. 4, 1995

[54] REACTIVE MEDIA-INK SYSTEM FOR INK JET PRINTING

[75] Inventors: Robert P. Held, Manalapan, N.J.; Daphne P. Fickes, Kennett Square, Pa.; Joseph E. Reardon, Wilmington, Del.; Ray A. Work, III, Kennett Square, Pa.

[73] Assignee: E. I. Du Pont de Nemours and Company, Wilmington, Del.

[21] Appl. No.: 203,451

[22] Filed: Feb. 28, 1994

[51] Int. Cl.⁶ .................................... B32B 3/00
[52] U.S. Cl. ............................ 428/195; 428/207; 428/411.1; 428/500; 428/515; 428/913; 427/261
[58] Field of Search ............... 428/195, 913, 914, 206, 428/411.1, 323, 207, 500, 515; 427/261, 250

[56] References Cited

U.S. PATENT DOCUMENTS

| | | | |
|---|---|---|---|
| 4,474,847 | 10/1984 | Schroder et al. | 428/323 |
| 4,554,181 | 11/1985 | Cousin et al. | 427/261 |
| 4,564,560 | 1/1986 | Tani et al. | 428/411.1 |
| 4,592,951 | 6/1986 | Viola | 428/323 |
| 4,649,064 | 3/1987 | Jones | 427/256 |
| 4,694,302 | 9/1987 | Hackleman et al. | 346/1.1 |
| 4,832,984 | 5/1989 | Hasegawa et al. | 427/161 |
| 4,900,620 | 2/1990 | Tokita et al. | 428/330 |
| 5,006,862 | 4/1991 | Adamic | 346/1.1 |
| 5,141,797 | 8/1992 | Wheeler | 428/195 |

*Primary Examiner*—Patrick J. Ryan
*Assistant Examiner*—William A. Krynski

[57] ABSTRACT

An ink/media set is provided having improved durability. The ink contains an aqueous medium and a dye or pigment dispersion as the colorant. The media has a coating that contains a hydrophilic polymer and a reactive component. The printed media is exposed to an energy source that binds the ink to the media coating, and renders the coating more durable.

16 Claims, No Drawings

REACTIVE MEDIA-INK SYSTEM FOR INK JET PRINTING

FIELD OF THE INVENTION

This invention relates to ink and media used in ink jet printing, and more particularly, to an ink-media set that results in a more durable, water-fast image.

BACKGROUND OF THE INVENTION

Ink jet printing is a non-impact method for recording information in response to an electronic signal, such as that generated by a computer. In the printer, the electronic signal produces droplets of ink that are deposited on a substrate or media such as paper or transparent film. Ink jet printers have found broad commercial acceptance due to their reliability, relatively quiet operation, graphic capability, print quality, and low cost.

In current ink jet printing applications, several inks (typically black, cyan, magenta and yellow) are used to print textual and graphic information on a printing medium, typically ordinary paper. The inks primarily are composed of water, and contain a colorant that may be a dye or pigment dispersion. Pigment dispersions are preferred since the dyes are highly soluble and tend to smear upon handling, with the pigment dispersions offering improved water and smear resistance, as well as better light stability. The inks also generally contain a polyhydric alcohol to prevent nozzle clogging, and may contain various adjuvants. Such inks and ordinary paper are well suited for desk-top publishing, as currently practiced, wherein only a small portion of the paper receives printed text and graphic information.

It also is desired to reproduce high quality colored pictoral information (such as photographs and the like) using ink jet technologies for applications such as commercial printing and desk-top publishing. In these applications, however, the printing medium will receive substantially more of the black and colored inks to accurately reproduce the various hues, tints, and colors contained in a typical colored picture. For example, the printing medium will be expected to receive up to 200% or more coverage in conventional commercial printing.

Ordinary paperstock is not suitable for such high quality applications for a number of reasons. Water disrupts the paper structure, causing "cockle" that affects appearance of the paper and, in extreme cases, may actually cause the paper to distort to the extent that it contacts the ink jet pen, disrupting the printing process. Also, the paper may not absorb water sufficiently quickly to achieve the desired printing speed, or may cause flooding of the paper surface, which adversely affects image quality. Moreover, wicking of ink into the paper may cause the paper to "show through" into the printed image, detracting from image quality. There also is a need for the printed text and pictures to be more robust; e.g., exhibit better handleability, water fastness, and smear resistance after printing. Accordingly, there is a need for improved printed images produced by ink jet printing in general, and particularly for applications of ink jet printing technologies to commercial printing and for reproduction of pictorial information.

U.S. Pat. No. 5,006,862 discloses improved water-fastness and smear resistance of prints from inks using reactive dyes in which the reactive moiety is attached to the chromophore and treated with a strong base solution. The reactive moiety is capable of forming a covalent bond to the paper substrate.

U.S. Pat. No. 4,694,302 discloses a method of increasing the water-fastness and print quality of an ink in ink jet printers by providing a reactive species that reacts with a component in the substrate (i.e. paper) to form a polymer that binds the dye in the ink to the polymeric lattice. Alternately, a separate reactive component may be deposited on the substrate on the same location as the reactive species which causes the polymeric reaction to occur. This can result in making the dye image somewhat waterfast, but does not provide a durable print, since the media in non-image areas is not altered. This method is also limited to the use of certain papers or dyes.

U.S. Pat. No. 5,141,797 discloses an ink jet paper comprising a water-soluble polymeric binder, a titanium chelate crosslinking agent and an inorganic filler. The crosslinking agent crosslinks the binder to prevent dusting off of the pigment from the ink jet paper's surface. The crosslinking occurs during preparation of the media, ie. during drying, which is prior to application of the ink jet ink to the paper.

Current special ink jet media employ vehicle absorbtive components, and optionally additives, to bind the dyes to the media. The purpose is to provide reduced bleed, whereby the intrusion of one color into an adjacent color is minimized. As a consequence current media are inherently moisture sensitive, can be quite fragile to handling, and are subject to finger smearing. Moreover, the vehicle absorptive components usually consist of water-soluble polymers which results in slower printing speeds. In addition the water absorptive components leave the paper quite sensitive to moisture and smearing.

Thus, a need exists for an ink-media set that will provide a printed image having improved durability, water-fastness, and smear resistance in both imaged and non-imaged areas. A specific need exists for such an ink-media set capable of reproducing colored pictoral information in high quality, thereby meeting the demanding requirements of commercial printing.

SUMMARY OF THE INVENTION

The present invention provides an ink/media set that provides improved durability, water-fastness, and smear resistance in both imaged and non-imaged areas, following printing and exposure of the printed media to an external energy source. Accordingly, the invention provides an ink/media set comprising:

(a) an ink containing an aqueous carrier medium and a dye or pigment colorant; and
(b) a media comprising a support that bears a coating containing at least one hydrophilic polymer and at least one reactive component that both reacts with the ink colorant and the hydrophilic polymer contained in the media upon exposure to an external energy source.

In a preferred embodiment, the ink colorant is a pigment dispersion having a polymeric dispersant that binds to the pigment particles and reacts with a media component upon exposure to the external energy source.

The ink/media set has general utility in printing, particularly in ink-jet printing applications, and special utility in demanding ink-jet printing applications involving printing of pictoral information in addition to text, such as commercial printing.

DETAILED DESCRIPTION OF THE INVENTION

The present invention provides an ink jet ink/media set which provides printed images having improved durability, water-fastness and smear resistance, on both imaged and non-imaged areas of the media. Preferably, the media coating is applied by aqueous coating technique.

INK COMPOSITION

The ink has an aqueous carrier medium and a colorant, which may be a dye or pigment dispersion, that will react with a component of the media coating under prescribed conditions. Preferably the colorant will be a pigment dispersion, in which case a polymeric material may serve both as the pigment dispersant and as a polymer that is caused to react with the media coating subsequent to printing. The ink also may contain other additives known in the art.

AQUEOUS CARRIER MEDIUM

The aqueous carrier medium is water or a mixture of water and at least one water-soluble organic solvent. Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698. A mixture of water and a polyhydric alcohol, such as diethylene glycol, is preferred as the aqueous carrier medium.

If a mixture of water and a water-soluble solvent is used, the aqueous carrier medium typically will contain 30% to about 95% water with the balance (i.e., 70 to 5%) being the water-soluble solvent. Preferred compositions contain approximately 60% to 95% water, based on the total weight of the aqueous carrier medium.

The amount of aqueous carrier medium in the ink is in the range of approximately 70 to 99.8%, preferably 94 to 99.8%, based on total weight of the ink when an organic pigment is selected; approximately 25 to 99.8%, preferably 70 to 99.8% when an inorganic pigment is selected; and 80 to 99.8% when a dye is selected.

COLORANTS

The colorant may be a pigment, used in an insoluble particulate state, or a dye, typically used in a soluble state. Dispersed dyes also may be selected. The pigment will be used with a polymeric dispersant, and the dye may be used with a polymeric additive, as discussed below. Either the dye, pigment, or pigment dispersant contains groups that will react with a media component under prescribed conditions, preferably by covalent bonding.

Pigments

Organic or inorganic pigments may be selected, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 micron. Preferably, the pigment particle size should range from 0.005 to 5 micron and most preferably, from 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used to advantage are disclosed in U.S. Pat. No. 5,085,698.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

Organic pigments may be selected having groups that will react with a media component. Representative functional groups are acid, base, epoxy, and hydroxy groups.

When an organic pigment is selected, the ink may contain up to approximately 30% pigment by weight, but typically will be in the range of 0.1 to 15% (preferably 0.1 to 8%) by weight for most thermal ink jet printing applications. If an organic pigment is selected, the ink will tend to contain higher weight percentages of pigment than with comparable inks employing organic pigment, and may be as high as approximately 75% in some cases, because inorganic pigments generally have higher specific gravities than organic pigments.

Dyes

The selected dye will contain groups capable of forming a bond with a media component, preferably a covalent bond. Alternatively, the dye may be encapsulated or bound to an ink component that bonds with a media component. Anionic, cationic, amphoteric and nonionic dyes meeting this criteria may be selected. Such dyes are well known in the art. Anionic dyes yield colored anions in aqueous solution and cationic dyes yield colored cations. Typically anionic dyes contain carboxylic or sulfonic acid groups as the ionic moiety and encompass all acid dyes. Cationic dyes usually contain quaternary nitrogen groups, and encompass all basic dyes.

The types of anionic dyes most useful in this invention are Acid, Direct, Food, Mordant, and Reactive dyes. Anionic dyes are nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most useful in this invention are the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others.

The color and amount of dye used in the ink composition is largely a function of choice, being primarily dependent upon the desired color of the print achieved with the ink, the purity of the dye and its strength. Low concentrations of dye may not give adequate color vividness. High concentrations may result in poor printhead performance or unacceptably dark colors. The dye is present in the amount of 0.01 to 20%, by weight, preferably 0.05 to 8%, by weight, more preferably 1 to 5%, by weight, based on the total weight of the ink.

POLYMER

Pigments will be used in conjunction with a polymeric dispersant, which preferably will be an AB, BAB, or ABC block copolymer having component groups capable of reacting with a media component. For example, the dispersant may contain acid or amine groups that will serve this function. In addition, the dispersant may include a Reactive Component as discussed hereinafter. Random polymeric dispersants are also known in the art, and may be selected in practicing the invention.

In AB or BAB block copolymers, the A segment is a hydrophobic homopolymer or copolymer which serves to link with the pigment and the B block is a hydrophilic homopolymer or copolymer, or salts thereof, and serves to disperse the pigment in the aqueous medium. Such polymeric dispersants and the synthesis thereof are disclosed in Ma et al., U.S. Pat. No. 5,085,698. ABC triblocks are also useful as pigment dispersants. In the ABC triblock, the A block is a polymer compatible with water, the B block is a polymer capable of binding to the pigment and the C block is compatible with the organic solvent. The A and C blocks are end blocks. ABC triblocks and their synthesis are disclosed in Ma et al., European Patent Application 0 556 649 A1 published Aug. 28, 1993.

Although random copolymers can be used as dispersing agents, they are not as effective in stabilizing pigment dispersions as the block polymers, and therefore are not preferred. Useful random interpolymers have narrowly controlled molecular weight ranges preferably having poly dispersivities of 1-3, preferably 1-2. These polymers are substantially free of higher molecular weight species that readily plug pen nozzles. Number average molecular weight must be less than 10,000 Daltons, preferably less than 6,000, most preferably less than 3,000. As with the above-described block polymers, these random polymers contain hydrophobic and hydrophilic monomer units. Commercial random dispersant polymers will plug pen nozzles readily. However, needed molecular weight control can be obtained by using the Group Transfer Polymerization technique, or other methods that deliver low dispersivity. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl [meth]acrylate and salts thereof. Also quaternary salts of dimethylaminoethyl [meth]acrylate may be employed.

When a dye is selected, a polymer may be added to the ink for a variety of reasons. For example, anionic polymers may be added to dye based ink jet inks, more specifically anionic dye based ink jet inks, to provide inks substantially free of puddling and having improved crusting properties or decap. The polymer additive may have component groups that react with a media component, or may include a Reactive Component.

OTHER INGREDIENTS

Consistent with the particular application, various types of additives may be used to modify the properties of the ink composition. Anionic, nonionic, or amphoteric surfactants may be used in addition to the polymeric dispersants. A detailed list of nonpolymeric as well as some polymeric surfactants are listed at pages 110-129, of 1990 McCutcheon's Functional Materials, North American Edition, Manufacturing Confection Publishing Co., Glen Rock, NJ. The choice of a specific surfactant is highly dependent on the particular ink composition and type of media substrate to be printed. One skilled in the art can select the appropriate surfactant for the specific substrate to be used in the particular ink composition. In aqueous inks, the surfactants may be present in the amount of 0.01-5% and preferably 0.2-2%, based on the total weight of the ink.

Cosolvents may be included to improve penetration and pluggage inhibition properties of the ink composition, and in fact are preferred. Such cosolvents are well known in the art. Representative cosolvents that can be used to advantage are exemplified in U.S. Pat. No. 5,272,201. Biocides may be used to inhibit growth of microorganisms. Dowicides ® (Dow Chemical, Midland, MI), Nuosept ® (Huls America, Inc., Piscataway, NJ), Omidines ® (Olin Corp., Cheshire, CT), Nopcocides ® (Henkel Corp., Ambler, PA), Troysans ® (Troy Chemical Corp., Newark, NJ) and sodium benzoate are examples of such biocides. Sequestering agents such as EDTA may also be included to eliminate deleterious effects of heavy metal impurities. Other known additives, such as humectants, viscosity modifiers and other acrylic or non-acrylic polymers may also be added to improve various properties of the ink compositions as desired.

INK PROPERTIES

Jet velocity, separation length of the droplets, drop size and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The inks have excellent storage stability for a long period and do not clog in an ink jet apparatus. Fixing of the ink on the media or image recording material, such as, paper, fabric, film, etc. having the appropriate coating thereon, can be carried out speedily and surely. The printed ink images have clear color tones, high density, excellent water resistance and light fastness. Further, the ink does not corrode parts of the ink jet printing device it comes in contact with, and it is essentially odorless, and non-toxic.

MEDIA

The media (i.e., ink jet recording sheet) is a support that bears a coating that contains at least one hydrophilic polymer and at least one reactive component. The hydrophilic polymer generally will be water-soluble in order that it may be applied to the support using conventional aqueous coating techniques.

SUPPORT

The support (i.e., substrate) may be any of those commonly used in printing. For ink jet ink applications in particular, cellulose and non-cellulose type substrates may be used to advantage, with porous cellulose type substrates, such as paper, being preferred. If sized, the degree of sizing for the substrate can be from 1 second to 1000 seconds as measured by the Hercules size test (HST), as described in TAPPI standards T530 PM-83. The substrate is chosen so its HST value is compatible with the volume and composition of the ink drop in the printer to be used. The preferred HST is in the range of 200 to 500 seconds, most preferably 350 to 400 seconds. Some useful papers are copier grade paper, 100% bleached kraft composed of a blend of hard and soft wood, 100% wood free cotton vellum, and wood containing paper made translucent either by pulp beating or with additives. A preferred paper is Gilbert Bond paper (25% cotton) designated style 1057, manufactured by Mead Company, Dayton, OH. Standard resin coated papers used in the photographic industry such as polyclad papers, preferably polyethylene clad papers, also may be selected to advantage.

Some illustrative examples of support for ink jet transparencies, which are non-porous and usually have a thickness of about 50 to 125 microns (preferably from about 100 to about 125 microns), include polyester films such as Mylar ® flexible film, commercially available from E. I. du Pont de Nemours and Company, Wilmington, DE; Melinex ® film, commercially available from Imperial Chemicals, Inc.; Celanar ® film, commercially available from Celanese Corp.; polycarbonates such as Lexan ® sheet film, commercially available from The General Electric Company, Fairfield, CT; polysulfones, cellulose triacetate; polyvinylchlorides; and the like. Mylar ® polyester film is preferred because of its availability and low cost. Coated transparent films, such as gel subbed polyester films, or polyester films with white opaque coatings on them used as proofing receptors, are also useful in practicing the invention.

Other substrates, such as cardboard or fabrics, may be selected for specialty applications.

COATING COMPONENTS

Hydrophilic Polymer

The coating is primarily composed of a water-soluble hydrophilic polymeric binder having hydroxy or carboxyl groups. Representative binders are polyvinyl alcohol, polyvinyl alcohol copolymers such as poly(vinyl alcohol-co-vinyl acetate) and poly(vinyl alcohol-co-vinyl pyrrolidone), polyvinyl pyrrolidone, polyvinyl pyrrolidone copolymers such as poly(vinyl pyrrolidone-co-vinyl acetate), hydroxypropyl cellulose, sodium alginate, water-soluble phenol formaldehyde resins, carboxylated styrene butadiene polymers, carboxymethyl cellulose, soluble collagen, gelatin, hydrolyzed ethylene vinyl acetate polymers, and polysaccharides such as xanthan gum, gum tragacanth, locust bean gum, carrageenan, guar gum, agar, and the like. Super absorbent acrylic or methacrylic polymer, where the acrylic or methacrylic polymer is modified to the salt form of the carboxylates or sulfonates, may be selected to advantage. An example of a super absorbent polymer is Abcote ® 56220 sold by Morton Company. Preferred are polyvinyl alcohol or a polyvinyl alcohol copolymer, such as poly(vinyl alcohol-co-vinyl acetate) commonly known as partially hydrolyzed poly(vinyl alcohol).

Alternatively, the hydrophilic polymer may be non-water soluble. Representative polymers are acrylic resins such as poly(methyl methacrylate/ethylacrylate/acrylic acid), and mixed cellulose esters such as cellulose acetate phthalate. These polymers may be solvent coated, or aqueous coated in their salt form.

Reactive Component

The coating contains at least one "Reactive Component" that, after printing, is activated by an external energy source to react both imaged and non-imaged areas of the printed media, and bind the ink to the media coating. In preferred embodiments, the ink is a pigment dispersion and the polymeric dispersant is caused to react with a media component. The same result may be achieved with dye-based inks by selecting dyes that will react with the Reactive Component in the binder, upon exposure to an external energy source following the printing operation.

The Reactive Component may contain reactive acid groups, base groups, epoxy groups, styryl-pyridinium groups, styryl-pyrollium groups, dimethylmaleimide groups, cinnamic groups, unsaturated acrylic groups, bis-azides, or organic titanates that react with other groups present in the coating and ink. Catalysts may be included to initiate or accelerate reactions. An external source of energy such as UV radiation or heat may be needed to start the reaction. UV initiators may be included to generate active species, such as free radicals or strong acids to start particular reactions.

Heat may be used to start a cross-linking reaction using, for example, an organic titinate such as Tyzor ® crosslinking agent. Some organic titanates useful for this purpose have the general structure:

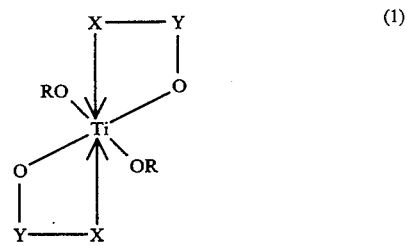

(1)

wherein
- X is a functional group containing oxygen or nitrogen, e.g., ketone, ester, acid salt, etc.;
- Y is alkyl of 1 to 6 carbon atoms or arylalkyl wherein aryl is 6 to 10 carbon atoms and alkyl is 1 to 6 carbon atoms;
- R is hydrogen, alkyl of 1 to 6 carbon atoms, or hydroxy substituted alkyl of 1 to 6 carbon atoms; and

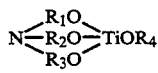

(2)

wherein $R_1$, $R_2$ or $R_3$ can be the same or different, and are alkyl of 1 to 4 carbon atoms, and $R_4$ is alkyl of 1 to 6 carbon atoms. Suitable titanium crosslinking agents are known in the art and may be prepared as described in Smeltz, U.S. Pat. No. 4,609,479.

Multivalent metal salts such as calcium, magnesium, zinc, aluminum, may be used in combination with the Reactive Component to generate a chemical reaction with the coating and ink.

Derivatives of hydrophilic polymers having pendant photocrosslinkable groups may be used to advantage in the coating or the ink. Upon exposure these groups react to form crosslinks between different polymer chains. Suitable photocrosslinkable polymers are described in A. Reiser, *Photoreactive Polymers: The Science and Technology of Resists*, Wiley, New York, 1989, pp 24–32. Typical photocrosslinkable groups are the cinnamyl, chalcone, alpha-phenylmaleimide, N-alkyl styrylpyridinium, and N-alkyl styrylquinolinium groups.

Derivatives of polyvinyl alcohol having photocrosslinkable groups, such as N-alkyl styrylpyridinium or N-alkyl styrylquinolinium groups, are preferred. Such polymers are described in K. Ichimura and S. Wantanabe, *J. Polym. Sci., Polym. Lett. Ed.*, 18, 613 (1980) and 20, 1411, 1419 (1982) as well as in Ichimura, U.S. Pat. Nos. 4,272,620, 4,287,335, 4,339,524, 4,564,580 and 4,777,114.

Substituted hydrophilic polyvinyl alcohol polymers typically are prepared by derivatization of saponified polyvinyl acetate with the appropriate photo-crosslinking group. It is desirable for the polyvinyl acetate to be at least 70% hydrolyzed. Typically 88% saponified polyvinyl acetate is selected, but polyvinyl acetate which is more or less highly saponified can be used. The photocrosslinkable group can be attached to the polyvinyl kalcohol by any appropriate chemical linkage, such as an ester, ether, or acetal linkage. The acetal linkage is preferred. Typically 0.5–10 mol % photocrosslinkable groups, preferably 1–4 mol %, are present. The degree of polymerization of the polyvinyl alcohol, i.e., the number of monomer units in the polymer chain, is advantageously in the range of 400 to 3,000. When the polymerization degree is too low, the exposure time required for loss of hydrophilic character is lengthened. When the polymerization degree is too large, the viscosity of solutions containing the polymer becomes so large that they are difficult to prepare and coat.

Styrylpyridinium or styrylquinolinium acrylates or methacrylates which may be used as the dispersant in pigmented ink jet inks, or as a polymeric additive in a dye based ink, are prepared as described in U.S. Pat. No. 4,272,620, using hydroxy containing acrylates or methacrylates instead of polyvinyl alcohol.

Bis-azides are another class of polyfunctional photoactivatable crosslinking agents that may be selected. These compounds are typically aromatic bisazides substituted with one or more ionic groups (such as sulfonate, carboxylate or sulfate groups) to increase water solubility. Typical useful bis-azides are sodium 4,4'-diazidostilbene-2,2'-disulfonate, sodium 4,4'-diazidobenzalacetophenone-2-sulfonate, and sodium 4,4'-diazidostilbene-alpha-carboxylate. A preferred bisazide is sodium 4,4'-diazidostilbene-2,2'-disulfonate. Equivalent results may be obtained from the use of bisazides containing other cations in place of sodium, such as potassium, ammonium, and substituted ammonium (e.g., ethyl ammonium or tetramethyl ammonium).

Loss of hydrophilic character is generally achieved by photoinitiated polymerization and/or crosslinking reactions. The resulting change in physical properties, particularly the increase in molecular weight and/or network formation, changes the hydrophilic character of the coating or ink jet ink.

Other Media Coating Components

The coating generally also contains an inorganic filler component. Conventional inorganic fillers, such as silica, various silicates, zeolites, calcined kaolins, diatomaceous earths, barium sulfate, aluminum hydroxides, or calcium carbonate, are suitable for this purpose. The ratio of filler to polymer will vary with the particular components and substrate, but generally be within the range of 7 to 1, to 0.5 to 1. Above 7 to 1, dusting tends to occur, and below 0.5 to 1, the coating tends to become too glossy.

Other components may be present as well. For example, the composition may contain a surfactant, plasticizer, humectant, UV absorber, polymeric dispersant, defoamer, mold inhibitor, antioxidant, latex, dye mordant and optical brightener for conventional purposes.

PREPARATION

The surface coating is applied to the sheet support surface in a dry coating weight range of about 2 $g/M^2$ to about 10 $g/M^2$ for low coverage images. At a dry coating weight of less than about 2 $g/M^2$, the ink spread during printing generally is too great. Appropriate coating weight is needed to provide sufficient ink vehicle absorbing capacity to prevent ink spread and/or puddling and to minimize cockle with porous substrates. Thus, the coating weight range for high coverage images should be about 5 to 20 preferably about 8 to 15 $g/M^2$. The surface coating is applied to the sheet support by conventional coating methods such as roller coating or knife coating methods, e.g., air knife, trailing blade, etc. All the ingredients can be premixed to form the coating that is applied to the surface of the sheet support at the dry coating weights set out above.

APPLICATIONS

The ink is applied to the coated media using conventional techniques such as thermal or bubble jet printers, piezoelectric printers, continuous flow printers, or valve jet printers. After the ink is printed on the media, the printed media is air dried.

In preferred embodiments, the media either contains a reactive component activated by heat, in which case a heated roll or platen conveniently may be employed, or radiation (such as UV), in which case a uniform exposure to the radiation conveniently may be employed to render both imaged and non-imaged areas of the printed media more durable, water-fast, and smear-resistant, as well as to improve the binding of the ink colorant to the coating. The media/ink set is particularly well adapted for the printing of colored pictoral information, as well as text and graphic information, in commercial printing or desk-top publishing applications, as well as wide format applications such as the printing of signs, banners, and the like.

The invention will now be further illustrated, but not limited, by the examples.

EXAMPLES

GLOSSARY:

| | |
|---|---|
| SPP polymers | Polyvinyl alcohols acetalized with N-methyl-4-(p-formylstyryl)-pyridinium methosulfate; Toyo Gosei Kogyo Co., Ltd., Ichikawa City, Chiba Pref., Japan |
| BMA//BMA/MAA | n-butyl methacrylate//n-butyl methacrylate/methacrylic acid. |
| (IBMA/EHMA/HEMA)/ MMA/ST/BA/HEA/MAA) | (Isobutyl methacrylate/2-Ethyl hexyl methacrylate/Hydroxy ethyl methacrylate)(5/75/20)/Methyl methacrylate/Styrene/Butyl acrylate/Hydroxy ethyl acrylate/methacrylic acid (30/19/13/18/14/5) |
| BMA/MMA//HEMA | n-butyl methacrylate/-Methylmethacrylate/Hydroxy ethyl methacrylate |

Example 1

UV curable ink jet media coatings were made of the following formulations:

Sample A was prepared by coating a 6% solids solution of SPP—11-KM in water on a gel subbed 10.16 micron thick polyester film base using a 25.4 micron doctor blade coating knife to give a dry coating weight of about 13.5 g/m$^2$.

Sample B was prepared by coating a 6% solids solution of SPP—11-KM and calcium chloride (90/10 parts by weight) in water on a 12.7 micron thick polyethylene coated paper using a 25.4 micron doctor blade coating knife to give a dry coating weight of about 13.5 g/m$^2$.

Black, yellow and magenta ink jet inks were formulated as described in Examples 2, 6 and 8, respectively, of U.S. Pat. No. 5,085,698 issued Feb. 4, 1992 using the dispersant described in Preparation 4 of U.S. Pat. No. 5,085,698 which is BMA//BMA/MAA (5//2.5/5) and pigments: Raven ® 1170, carbon black pigment (Columbian Chemicals Company, Jamesburg, NJ), Sunbrite ® yellow 17, presscake, (21.5% solids, (Sun Chemical Corp., Cincinnati, OH) and Sunfast ® Magenta 122, presscake, 52.8% solids, (Sun Chemical Corp., Cincinnati, OH), respectively. The dispersant contained acid polymer functionality.

The inks were printed on a Hewlett-Packard Deskjet Printer (Hewlett-Packard, Palo alto, CA) in patterns for testing water fastness and smear fastness by wiping a dampened finger on the image. Water fastness was tested by dripping 0.25 cc of water onto the sample which was placed at a 45° angle to the horizontal.

The UV cured samples were treated with UV light in a Cyrel ® 1215 Exposure Unit (E. I. du Pont de Nemours and Company, Wilmington, DE) outfitted with high intensity UV fluorescent tubes with λmax=355nm, at a distance of 1½ inches (3.81 cm) from the media surface for 2 minute exposures.

Results of water fastness and smear fastness were comparisons of UV cured vs. non-UV cured samples.

| SAMPLE | UV Cure | Water Fastness | Smear Fastness |
|---|---|---|---|
| A | No | Poor | Poor |
| A | Yes | Poor-Fair | Poor-Fair |
| B | No | Poor | Poor |
| B | Yes | Excellent | Fair |

Results show a slight improvement in water fastness when the media containing no reactive species was cured, but a substantial improvement when the media containing the reactive species was cured providing reactive Ca++ for the acid groups on the dispersant polymer.

Smear fastness is only very slightly improved in this set of examples.

The media coating remains water-soluble until UV curing is done.

Example 2

A UV curable ink jet media was made with (1) a polymer containing hydroxyl functionality and acid salt functionality (IBMA/EHMA/HEMA)/MMA/ST-/BA/HEA/MAA, (2) a crosslinking catalyst, Cymel ® 1133 (American Cyanamid) (Melamine-formaldehyde resin), and (3) dodecylsulfonic acid in a weight ratio of 50/10/1. The polymer was solubilized with KOH or NH$_4$OH (a volatile base). Additional hydrophilic polymer, i.e. polyvinyl alcohol, for water absorbing capability was added to the formulation at 40%. This formulation was coated at a coating weight of about 10 g/m$^2$ on the substrates described in Example 1.

An ink jet ink was formulated with as described in Example 1 using (IBMA/EHMA/HEMA)/MMA/ST-/BA/HEA/MAA and Cymel ® 1133 crosslinking catalyst in a weight ratio of 50/10 as the dispersant.

The ink was drawn down, simulating printing on a Hewlett-Packard DeskJet Printer (Hewlett-Packard, Palo Alto, CA). Printed sheets were heated to 100° C. on a heated platten for varying incremental lengths of time.

The dodecylsulfonic acid released a strong acid with heating that catalyzed the reaction between the hydroxy groups and the Cymel ® crosslinking catalyst, resulting in a crosslinking that made the printed page more durable as evidenced by the water and smearing tests, similar to those described in Example 1., as the heating time increased to above 60 seconds.

Example 3

Example 2 was repeated with the following exceptions: in place of the dodecylsulfonic acid, triphenylsulfonium-hexafluorophosphate was added at 3% weight based on the polymer. The same inks were used as described in Example 2.

After printing, the media was subjected to UV light as in Example 1, and heated as in Example 2 to release a strong acid from the reactive triphenylsulfonium-hexafluorophosphate resulting in the acid catalyzed crosslinking of the hydroxy containing polymer both in the media and the ink with the Cymel ® resin. This results in making a printed page more durable to water fastness and smear fastness as evidenced by the water and smearing tests, similar to those described in Example 1, as the heating time increased to above 60 seconds.

Example 4

Example 2 is repeated with the following exception: the polymer containing hydroxy functionality also contains amine functionality, instead of the acid functionality, and is neutralized with acetic acid (a volatile acid) or phosphoric acid for solubilizing the polymer in the coating and ink vehicles.

The result of the crosslinking of the hydroxy and melamine formaldehyde resin by the generation of acid would give results similar to those obtained in Example 2, with the resultant improvement of print durability.

Example 5

Example 3 is repeated with the following exception: in place of the polymer that contains hydroxy and acid functionality, the polymer of Example 4 which contains hydroxy and amine functionality is used.

The result of the crosslinking of the hydroxy and melamine-formaldehyde resin by the acid catalyst which is generated by UV exposure would produce a marked improvement in print durability.

Example 6

A media is prepared using a polymer containing hydroxy and/or acid functionality (i.e. polyvinyl alcohol, or acrylic polymer containing acid function) and a crosslinking agent which is stable in the media and not activated until sufficient heat is applied after printing on that media with an ink containing a polymer dispersant with hydroxy or acid functionality. This media is prepared as follows:

| SAMPLE | INGREDIENT | AMOUNT (GMS) |
|--------|------------|--------------|
| A | 4% solution of polyvinyl alcohol, viscosity of 28-32 | 20 |
|   | Tyzor ® 131 organic titanate(DuPont) | 25 |
|   | Deionized water | 590 |
| B | Polymer of Example 2 | 20 |
|   | Tyzor ® 131 organic titanate(DuPont) | 25 |
|   | Deionized water | 590 |

The pH of both Samples A and B is adjusted to 4 to 4.5.

Both compositions are coated on polyethylene clad paper as described in Example 1 at a coating weight of 10 g/m$^2$.

Black magenta and yellow ink jet inks are formulated with the acid containing polymer dispersant and black magenta and yellow pigments, respectively, as described in Examples 2, 6 and 8, respectively, of U.S. Pat. No. 5,085,698.

The inks are printed on Samples A and B, on a Hewlett-Packard Deskjet printer, in the pattern used in Example 1. The printed sheet is heated to a 100° C. for about 2 minutes which is expected to result in crosslinking of the hydroxy and acid groups to the titanium in the Tyzor ®. This would result in an image having more durability to water and smear fastness when compared to non-heated samples.

Example 7

Example 1 is repeated with the following exception: the ink jet inks were formulated with a BMA/MMA//HEMA, (10/5//10) block polymer wherein styrylpyridinium formaldehyde is attached to the HEMA part of the block polymer using the procedure described in U.S. Pat. No. 4,272,620.

The ink jet ink dispersant would become incorporated into the media resulting in a media which should have improved water and smear fastness upon UV exposure.

Example 8

Example 3 is repeated with the following exception: triphenylsulfonium-hexafluorophosphate is incorporated in the ink at a concentration of 5% by weight based on the polymer weight. A post printing UV exposure would crosslink the UV curable ink and provide further enhancement of durability in the final print.

What is claimed is:

1. An ink/media set having improved durability when printed, said set comprising:
   (a) an ink containing an aqueous carrier medium and a dye or pigment colorant; and
   (b) a media comprising a support that bears an ink receiving coating containing at least one hydrophilic polymeric binder and at least one reactive component, said reactive component reacting with said ink colorant and said hydrophilic polymeric binder in the coating upon exposure to an external energy source after printing of said ink on said coating, thereby reacting both imaged and non-imaged areas and binding said ink to said coating.

2. The ink/media set of claim 1 wherein the ink contains a pigment dispersion that consists of pigment particles and a polymeric dispersant.

3. The ink/media set of claim 1 wherein said hydrophilic polymeric binder is selected from the group consisting of polyvinyl alcohol and copolymers thereof, polyvinyl pyrrolidone and copolymers thereof, hydroxypropyl cellulose, acrylic resins and salts thereof, sodium alginate, water-soluble phenol formaldehyde resins, carboxylated styrene butadiene polymers, carboxymethyl cellulose, mixed cellulose esters, soluble collagen, gelatin, hydrolyzed ethylene vinyl acetate polymers, and polysaccharides.

4. The ink/media set of claim 1 wherein said hydrophilic polymer is polyvinyl alcohol or a copolymer thereof.

5. The ink/media set of claim 1 wherein said reactive component contains reactive acid groups, epoxy groups, styryl-pyridinium groups, styryl-pyrollium groups, dimethyl-maleimide groups, cinnamic groups, unsaturated acrylic groups, bis-azides or organic titanates.

6. The ink/media set of claim 5 wherein a multivalent metal salt is also present.

7. The ink/media set of claim 5 wherein said reactive component is a constituent of said hydrophilic polymer.

8. The ink/media set of claim 5 wherein said reactive component is a separate compound present in said media.

9. The ink/media set of claim 5 wherein said reactive component is activated by ultraviolet light.

10. The ink/media set of claim 5 wherein said reactive component is activated by heat.

11. The ink/media set of claim 5 wherein said ink contains a pigment dispersion consisting of pigment particles and a polymeric dispersant that reacts with said reactive component of the media coating.

12. The ink/media set of claim 11 wherein said polymeric dispersant is an AB, BAB, or ABC block copolymer.

13. The ink/media set of claim 1 wherein said ink contains a reactive component specified in claim 5.

14. The ink/media set of claim 1 wherein said hydrophilic polymer is a polyvinyl alcohol derivative having pendant photocrosslinkable groups.

15. The ink/media set of claim 14 wherein said photocrosslinkable groups are cinnamyl, chalcone, alpha-phenyl-maleimide, N-alkyl styrylpyridinium, or N-alkyl styrylquinolinium groups.

16. The ink/media set of claim 1 wherein said coating contains an organic titinate having the structure:

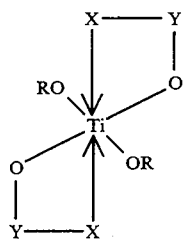
wherein X is a functional group containing oxygen or nitrogen;
Y is alkyl of 1 to 6 carbon atoms or arylalkyl wherein aryl is 6 to 10 carbon atoms and alkyl is 1 to 6 carbon atoms;
R is hydrogen, alkyl of 1 to 6 carbon atoms, or hydroxy substituted alkyl of 1 to 6 carbon atoms; or
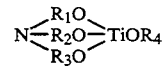
wherein $R_1$, $R_2$ or $R_3$ independently are alkyl of 1 to 4 carbon atoms, and $R_4$ is alkyl of 1 to 6 carbon atoms.
* * * * *